United States Patent [19]
Zimmerman

[11] Patent Number: 5,116,219
[45] Date of Patent: May 26, 1992

[54] INSECT COLLECTION APPARATUS

[76] Inventor: Mark R. Zimmerman, P.O. Box 272, Smithmill, Pa. 16680

[21] Appl. No.: 668,091

[22] Filed: Mar. 12, 1991

[51] Int. Cl.$^5$ ............................................. A01M 1/06
[52] U.S. Cl. ................................ 43/139; 55/DIG. 3; 15/352; 15/353
[58] Field of Search .................... 43/139, 140; 15/352, 15/353; 55/DIG. 3

[56] References Cited

U.S. PATENT DOCUMENTS

| | | | |
|---|---|---|---|
| 993,644 | 5/1911 | Brisbane | 43/139 |
| 1,071,620 | 8/1913 | Kingsland | 43/139 |
| 1,586,484 | 5/1926 | Suggs | 43/139 |
| 2,191,717 | 2/1940 | Jeffery | 55/DIG. 3 |
| 3,721,071 | 3/1973 | Mueller | 55/DIG. 3 |
| 4,342,131 | 8/1982 | Reid | 15/352 |
| 4,355,434 | 10/1982 | Gongwer | 15/352 |
| 4,358,300 | 11/1982 | Schlapman | 15/353 |
| 4,466,155 | 8/1984 | Grave | 15/353 |
| 4,625,453 | 12/1986 | Smith | 43/139 |

FOREIGN PATENT DOCUMENTS

| | | | |
|---|---|---|---|
| 3509801 | 9/1986 | Fed. Rep. of Germany | 55/DIG. 3 |
| 172636 | 1/1935 | Switzerland | 43/139 |

Primary Examiner—Kurt Rowan
Attorney, Agent, or Firm—Leon Gilden

[57] ABSTRACT

An apparatus including a transportable housing, including a blower motor therewithin, the housing including fluid mounted within the housing positioned below the blower motor to effect drowning of insects directed into the housing. The housing includes a flexible intake conduit and a rigid outlet conduit. The blower motor is mounted within the housing, with an intake opening positioned and aligned adjacent an interior surface of the top wall of the housing. The flexible conduit optionally utilizes a directional handle rod for positioning of the intake conduit, wherein insect attractant is mounted and laminated within an interior surface of an intake funnel and positioned within the output conduit for directing insect attractant environmentally about the housing for attracting insects for their removal from overhanging trees, shrubs, and the like.

4 Claims, 4 Drawing Sheets

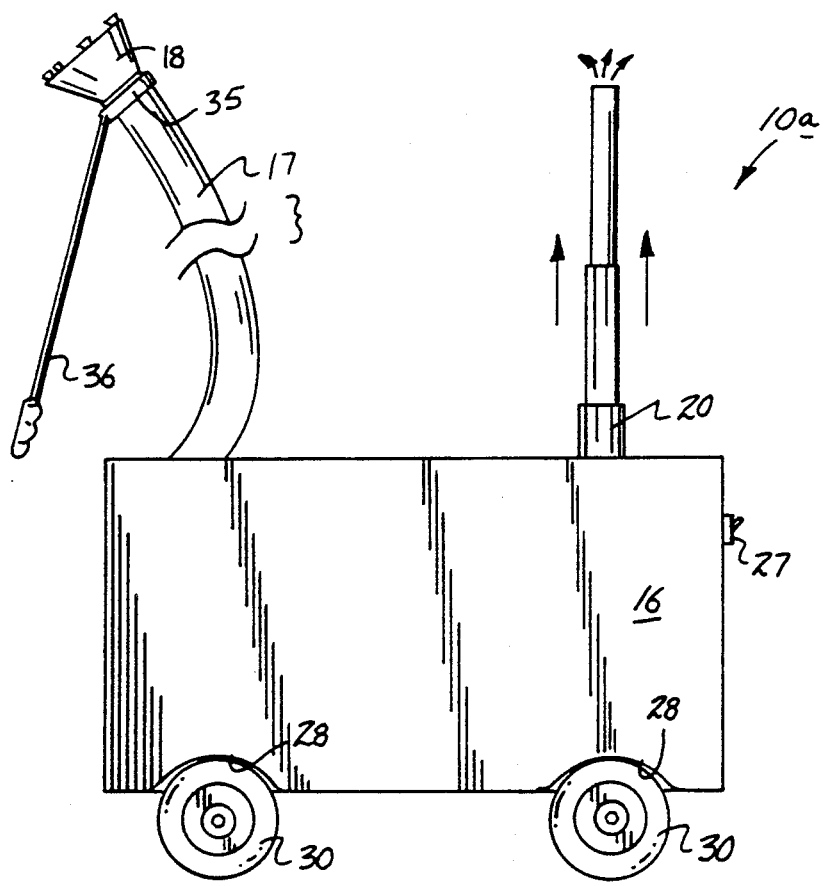
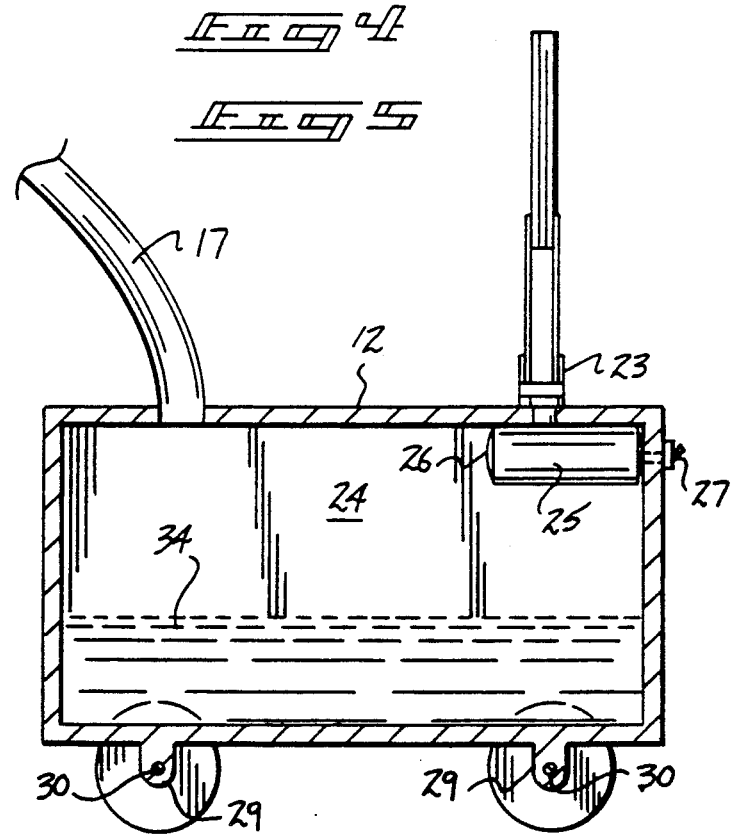

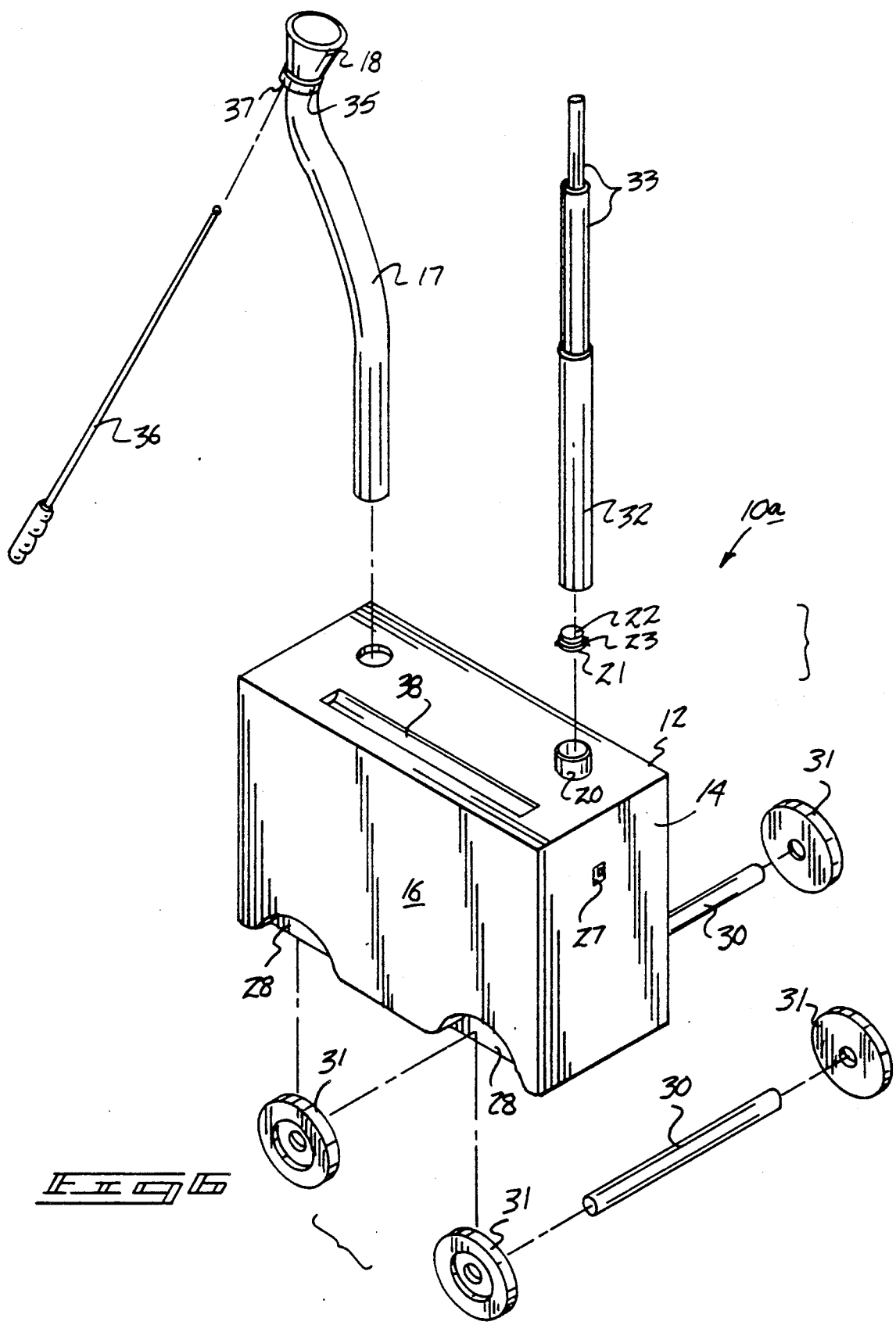

INSECT COLLECTION APPARATUS

BACKGROUND OF THE INVENTION

1. Field of the Invention

The field of invention relates to insect vacuum apparatus, and more particularly pertains to a new and improved insect collection apparatus wherein the same includes a mobile housing unit arranged for positioning adjacent shrubs, trees, and the like for extraction and removal of various insects therefrom through a vacuuming process effecting drowning of the insects

2. Description of the Prior Art

Various vacuum apparatus has been provided in the prior art for vacuuming of insects that are typically of a nuisance or detrimental classification of pests. Air is directed from an intake through an output conduit for collection of such insects, as set forth in U.S. Pat. No. 4,780,986 to Bromfield, et al. utilizing a coaxially aligned organization that is manually manipulated for vacuuming insects.

U.S. Pat. No. 4,733,495 to Winncki sets forth an insect extermination organization wherein an input conduit is arranged to direct insects into a collecting screen housing arranged rearwardly of the intake conduit.

U.S. Pat. No. 4,856,226 to Taylor sets forth a vacuum organization where insects are drawn into a lower chamber when attracted into the upper chamber by an incandescent bulb type structure.

As such, it may be appreciated that there continues to be a need for a new and improved insect collection apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of insect collection apparatus now present in the prior art, the present invention provides an insect collection apparatus wherein the same utilizes a selectively operative vacuum to effect vacuuming of insects into a fluid filled chamber. As such, the general purpose of the present invention, which will be described subsequently in greater detail, is to provide a new and improved insect collection apparatus which has all the advantages of the prior art insect collection apparatus and none of the disadvantages.

To attain this, the present invention provides an apparatus including a transportable housing, including a blower motor therewithin, the housing including fluid mounted within the housing positioned below the blower motor to effect drowning of insects directed into the housing. The housing includes a flexible intake conduit and a rigid outlet conduit. The blower motor is mounted within the housing, with an intake opening positioned and aligned adjacent an interior surface of the top wall of the housing. The flexible conduit optionally utilizes a directional handle rod for positioning of the intake conduit, wherein insect attractant is mounted and laminated within an interior surface of an intake funnel and positioned within the output conduit for directing insect attractant environmentally about the housing for attracting insects for their removal from overhanging trees, shrubs, and the like.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved insect collection apparatus which has all the advantages of the prior art insect collection apparatus and none of the disadvantages.

It is another object of the present invention to provide a new and improved insect collection apparatus which may be easily and efficiently manufactured and marketed.

It is a further object of the present invention to provide a new and improved insect collection apparatus which is of a durable and reliable construction.

An even further object of the present invention is to provide a new and improved insect collection apparatus which is susceptible of a low cost of manufacture with regard to both materials and labor, and which accordingly is then susceptible of low prices of sale to the consuming public, thereby making such insect collection apparatus economically available to the buying public.

Still yet another object of the present invention is to provide a new and improved insect collection apparatus which provides in the apparatuses and methods of the prior art some of the advantages thereof, while simultaneously overcoming some of the disadvantages normally associated therewith Still another object of the present invention is to provide a new and improved insect collection apparatus wherein the same is readily transportable and formed in a plurality of relative sizes for use in indoor as well as outdoor environments for the vacuuming, drowning, and collection of insects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic side view, taken in elevation, of a modification of the instant invention.

FIG. 5 is an orthographic cross-sectional illustration of the modification of the instant invention.

FIG. 6 is an isometric, exploded illustration of the modified invention.

DESCRIPTION OF THE PREFERRED EMBODIMENT

Figure 1:
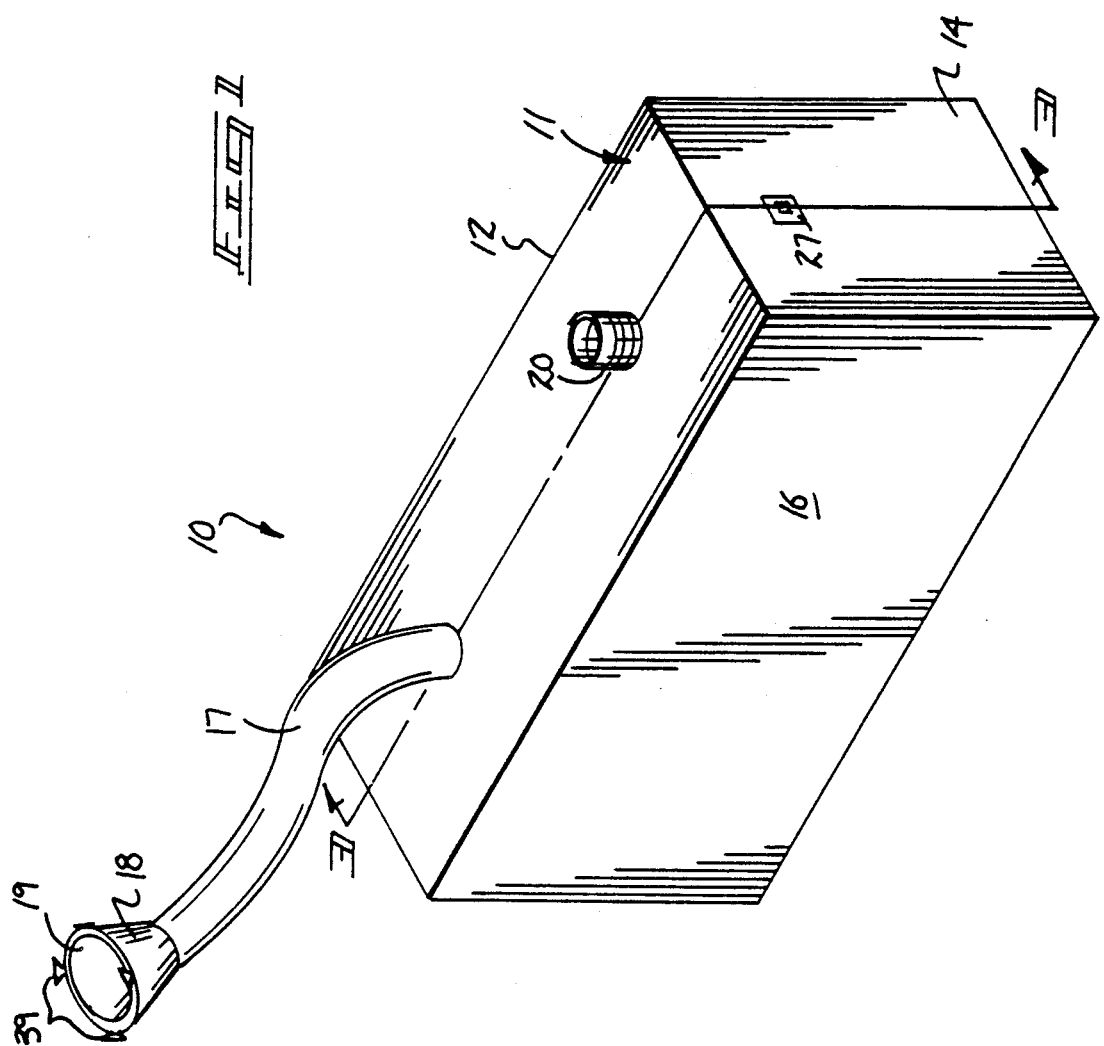
FIG. 1 is an isometric illustration of the instant invention.
Figure 2:
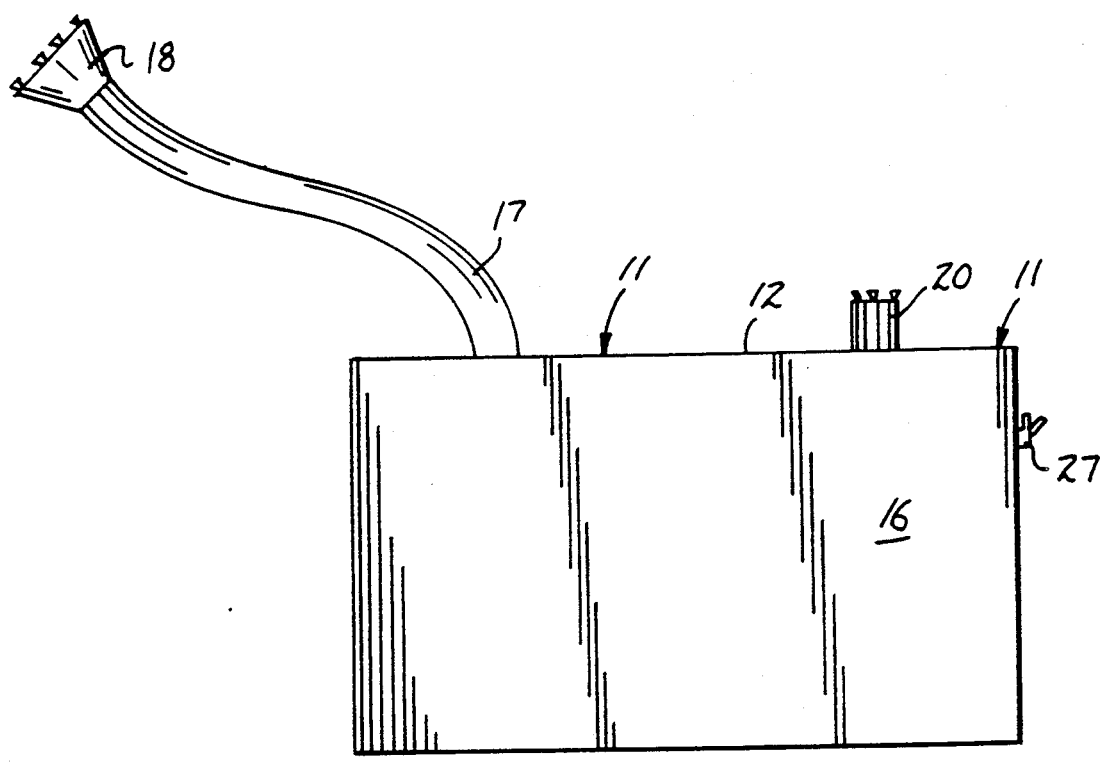
FIG. 2 is an orthographic side view, taken in elevation, of the instant invention.
Figure 3:
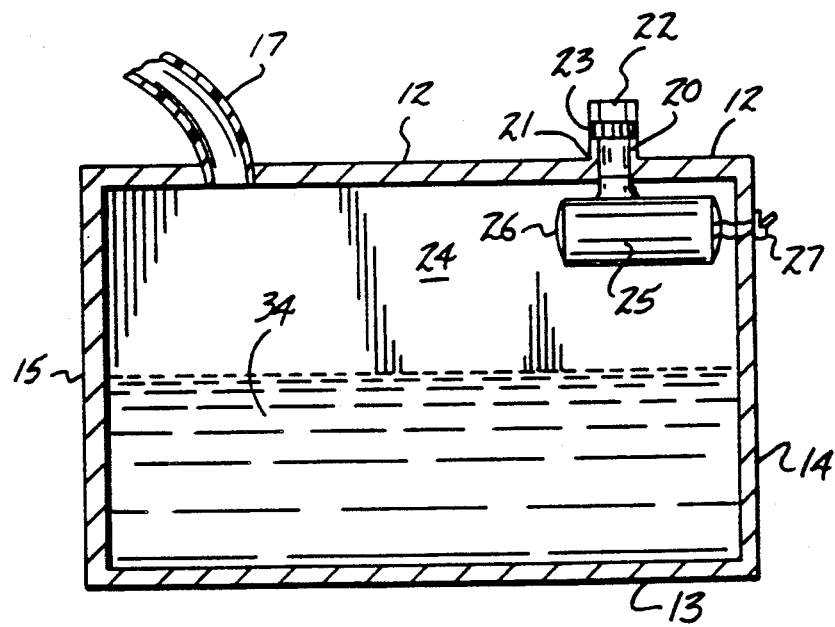
FIG. 3 is an orthographic cross-sectional illustration of the instant invention.

With reference now to the drawings, and in particular to FIGS. 1 to 6 thereof, a new and improved insect collection apparatus embodying the principles and concepts of the present invention and generally designated by the reference numerals 10 and 10a will be described.

More specifically, the insect collection apparatus 10 of the instant invention essentially comprises a rigid housing 11 defined by a top wall 12, a spaced bottom wall 13, spaced opposed end walls defined by a rear end wall 14 and a forward end wall 15, with the spaced side walls 16 defining an enclosure including a defined housing cavity 24 formed therewithin. The top wall 12 includes a flexible intake conduit 17 mounted in fluid communication with the housing cavity 24, with a funnel 18 mounted at a free terminal end of the flexible conduit 17 spaced from the top wall 12. The flexible intake conduit 17 and the funnel 18 are optionally provided with an insect attracting coating 19 laminated to an interior surface of the funnel and intake conduit 17. Further, if desired, optional artificial type attracting insect simulations are formed at an outer peripheral edge of the funnel 18. The simulations 39 are utilized to extend above an upper peripheral edge of the funnel 18 for enhanced visual effect.

A rigid output conduit 20 is in pneumatic communication with the housing cavity 24 directed through the top wall 12 spaced from the intake conduit 17. The output conduit 20 mounts a fixed lower screen 21 orthogonally directed to extend across the output conduit 20, with a removable upper screen 22 spaced above the lower screen 21 to capture a plurality of insect attracting pellets 23 that direct insect sexual hormone into the surrounding environment for attracting of insects. A blower motor 25 is arranged in pneumatic communication with the output conduit 20, and is operative through an on/off switch positioned on the rear end wall 14. The blower motor 25 includes a blower motor intake conduit aligned with an interior surface of the top wall 12 spaced above a fluid reservoir 34 secured within the housing cavity 24. The fluid reservoir effects a drowning of the insects when directed by vacuum into the cavity 24.

The modified invention, as illustrated in FIGS. 4-6, utilize plural pairs of semi-cylindrical recesses 28 directed through the side walls 16 aligned with one another mounting axle boss pairs 29 between the aligned semi-cylindrical recesses 28, where an axle 30 is directed through the axle boss pairs mounting a wheel 31 at each end of each axle.

To provide directing of the hormonal insect attractant into the surrounding environment and elevate such dispersal of the hormone into overlying trees and the like, a telescoping base 32 is defined by an external diameter substantially equal to an internal diameter defined by the output conduit 20 is mounted within the output conduit 20 and enhances securement of the upper screen 22 relative to the lower screen. The telescoping base 32 mounts a plurality of extensible sections 33.

To further ease positioning of the intake conduit 17 and its flexible orientation, a collar 35 is mounted about an intersection of the funnel 18 and the intake conduit 17, with a directional handle rod 36 mounted to the collar 35 through a pivotal connection 37.

For ease of storage of the organization, a semicylindrical cavity 38 is directed and formed through the top wall 12 to receive the telescoping base 32 and the extensible sections 33 therewithin for transport and storage of the telescoping base and extensible sections prior and subsequent to their use As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An insect collection apparatus comprising, in combination,
 a housing, the housing defined by a top wall, a bottom wall, a rear end wall, a forward end wall, and spaced side walls to define an enclosure including a housing cavity defined by the enclosure, and
 a flexible intake conduit directed into the housing cavity in pneumatic communication therewith, the flexible intake conduit including a funnel mounted at a free terminal end of the flexible intake conduit remote from the top wall, and
 a rigid output conduit mounted through the top wall in pneumatic commendation with the housing cavity spaced from the flexible intake conduit and positioned adjacent the rear end wall, and
 a blower motor fixedly mounted to the top wall within the housing cavity, the blower motor including an on/off switch mounted on the rear end wall to effect selective actuation of the blower motor, and wherein the blower motor includes a blower motor intake conduit aligned with the top wall directed along an interior surface thereof, and wherein the housing cavity includes a fluid reservoir formed therewithin positioned below the blower motor intake conduit and the blower motor, and wherein the flexible intake conduit and the funnel include an insect attracting coating formed within an interior surface of the flexible intake conduit and the funnel, and further including insect simulation decoys mounted about a periphery of the funnel directed exteriorly thereof.

2. An apparatus as set forth in claim 1 wherein the rigid output conduit is defined by a fixed interior diameter, and the output conduit includes a fixed lower screen mounted within the rigid output conduit, and a removable upper screen positioned in the rigid output conduit spaced above the fixed lower screen, and insect attracting pellets captured between the lower screen and the upper screen, and a telescoping base defined by a predetermined external diameter substantially equal to the predetermined internal diameter of the rigid output conduit and receivable within the rigid output conduit and overlying the removable upper screen to position the removable upper screen relative to the fixed lower screen 3. An apparatus as set forth in claim 2 wherein the telescoping base includes a plurality of extensible sections telescopingly receivable within a telescoping base, and the top wall including a semi-cylindrical cavity formed within the top wall for receiving the telescoping base and extensible sections therewithin for transport and storage of the telescoping base and extensible sections.

4. An apparatus as set forth in claim 3 including a collar mounted about the flexible intake conduit at an intersection defined by the funnel and flexible intake conduit, wherein the collar includes a rigid directional handle rod mounted to the collar at a forward terminal end of the direction handle rod, and a pivot connection mounting the forward terminal end of the rigid handle rod and the collar together.

* * * * *